United States Patent
Hamid et al.

(10) Patent No.: US 7,200,755 B2
(45) Date of Patent: Apr. 3, 2007

(54) METHOD AND SYSTEM FOR PROVIDING GATED ACCESS FOR A THIRD PARTY TO A SECURE ENTITY OR SERVICE

(76) Inventors: Larry Hamid, 561 Brookridge Crescent, Ottawa, ON (CA) K4A 1Z3; Derek Christopher Bouius, 2-12 Ross Avenue, Ottawa, ON (CA) K1Y 0N3; Albert Hum, 37 Stinson Avenue, Nepean, ON (CA) K2H 6N2

(*) Notice: Subject to any disclaimer, the term of this patent is extended or adjusted under 35 U.S.C. 154(b) by 828 days.

(21) Appl. No.: 09/863,301

(22) Filed: May 24, 2001

(65) Prior Publication Data

US 2002/0178367 A1 Nov. 28, 2002

(51) Int. Cl.
*H04L 9/00* (2006.01)
(52) U.S. Cl. .................... 713/186; 726/2; 382/115
(58) Field of Classification Search ............. 713/200, 713/201, 202, 186; 380/23, 270; 382/115; 726/2–3
See application file for complete search history.

(56) References Cited

U.S. PATENT DOCUMENTS

| | | | |
|---|---|---|---|
| 5,467,403 A * | 11/1995 | Fishbine et al. | 382/116 |
| 5,705,991 A | 1/1998 | Kniffin et al. | |
| 5,969,632 A * | 10/1999 | Diamant et al. | 340/5.3 |
| 6,219,793 B1 * | 4/2001 | Li et al. | 713/202 |

FOREIGN PATENT DOCUMENTS

| | | |
|---|---|---|
| WO | WO 99/56429 A | 11/1999 |
| WO | WO 00/23960 A | 4/2000 |
| WO | WO 01/57806 A | 8/2001 |

* cited by examiner

*Primary Examiner*—Giberto Barrón, Jr.
*Assistant Examiner*—T. B. Truong
(74) *Attorney, Agent, or Firm*—Woodcock Washburn LLP

(57) ABSTRACT

A security system for providing gated access for a third party to a secure entity or service and a method for operating the same is disclosed. The security system comprises a portable biometric device and a receiving module connected over a transmission channel. Biometric data in dependence upon a biometric characteristic such as a fingerprint of an authorized person is stored in memory of the portable biometric device. Biometric information of the person is captured, encoded and biometric data in dependence thereupon is provided to a processor. Using the processor the captured biometric data is then compared with the stored biometric data to produce a comparison result. If the comparison result is indicative of a match the first person is enabled to initiate provision of a gating signal for enabling signals provided by the third party to access the secure entity or service. The gating signal is received at a port of the secure entity or service. In response to the gating signal, a processor within a locking mechanism of the secure entity or service sets a flag for use in gating received signals provided by a third party for controlling access to the secure entity or service. The flag is set such that in a first state the locking mechanism is non-responsive to the signals and in a second other state the locking mechanism is responsive to the signals provided by the third party. If the first designated user has set the flag into the second other state access is provided to the secure entity or service by the third party upon receipt of a signal from the third party.

20 Claims, 7 Drawing Sheets

```
providing a first designated user with a first portable biometric device operable
to capture biometric information presented thereto, the portable biometric
device having stored biometric data in dependence upon a biometric
characteristic of the first designated user
```
↓
```
providing the third party with a second other portable biometric device operable
to capture biometric information presented thereto, the portable biometric
device having stored biometric data in dependence upon a biometric
characteristic of the third party
```
↓
```
capturing biometric information representative of a biometric characteristic in
response to the first designated user presenting said information to the first
portable biometric device and providing biometric data in dependence thereupon
```
↓
```
comparing the captured biometric data with the stored biometric data in the first
portable biometric device to produce a comparison result
```
↓

Fig. 4a

METHOD AND SYSTEM FOR PROVIDING GATED ACCESS FOR A THIRD PARTY TO A SECURE ENTITY OR SERVICE

FIELD OF THE INVENTION

This invention relates generally to automated security for permitting access to a service or a predefined area by a designated person or persons and more particularly relates to a biometric security system for providing gated access for a third party to a secure entity or service.

BACKGROUND OF THE INVENTION

Access to most any secure entity or service is commonly limited by use of a security system. The use of security systems is generally well known. Their use is increasing with greater availability of digital electronic components at a relatively low cost. Such systems are known for securing buildings, banks, automobiles, computers and many other devices.

For example, U.S. Pat. No. 4,951,249 discloses a computer security system, which protects computer software from unauthorized access by requiring the user to supply a name and a password during the operating system loading procedure ("boot-up") of a personal computer (PC). This PC security system, utilizing password protection, is typical of many systems that are currently available. Password protection requires a user's name and a password associated with that user's name. Only once an associated password is detected for a valid user's name does the PC complete the boot-up routine. Though passwords may be useful in some instances, they are inadequate in many respects. For example, an unauthorized skilled user with a correct password in hand, can gain entry to such a processor based system. Yet another undesirable feature of the foregoing system is that passwords on occasion are forgotten; and furthermore, and more importantly, passwords have been known to be decrypted.

As of late one of the most ubiquitous electronic components is the digital processor. Multi-purpose and dedicated processors of various types control devices ranging from bank machines, to cash registers and automobiles. With ever-increasing use of these processor-based devices, there is greater concern that unauthorized use will become more prevalent. Thus, the verification and/or authentication of authorized users of processor based systems is a burgeoning industry.

Alarms and security systems to warn of unauthorized use of automobiles and other processor controlled systems are available, however, these security systems have been known to be circumvented. Unfortunately, many commercially available solutions aimed at preventing theft or unauthorized use of automobiles have also been circumvented. As of late, initiatives have been underway in the security industry, to provide biometric identification systems to validate users of electronic and other systems that are to have restricted access. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references which are hereby incorporated by reference:

a) Xiao Qinghan and Bian Zhaoqi: An approach to Fingerprint Identification By Using the Attributes of Feature Lines of Fingerprint," IEEE Pattern Recognition, pp 663, 1986;

b) C. B. Shelman, "Fingerprint Classification—Theory and Application," Proc. 76 Carnahan Conference on Electronic Crime Countermeasures, 1976;

c) Feri Pernus, Stanko Kovacic, and Ludvik Gyergyek, "Minutaie Based Fingerprint Registration," IEEE Pattern Recognition, pp 1380, 1980;

d) J. A. Ratkovic, F. W. Blackwell, and H. H. Bailey, "Concepts for a Next Generation Automated Fingerprint System," Proc. 78 Carnahan Conference on Electronic Crime Countermeasures, 1978;

e) K. Millard, "An approach to the Automatic Retrieval of Latent Fingerprints," Proc. 75 Carnahan Conference on Electronic Crime Countermeasures, 1975;

f) Moayer and K. S. Fu, "A Syntactic Approach to Fingerprint Pattern Recognition," Memo Np. 73–18, Purdue University, School of Electrical Engineering, 1973;

g) Wegstein, *An Automated Fingerprint Identification System*, NBS special publication, U.S. Department of Commerce/National Bureau of Standards, ISSN 0083–1883; no. 500–89, 1982;

h) Moenssens, Andre A., *Fingerprint Techniques*, Chilton Book Co., 1971; and, i) Wegstein and J. F. Rafferty, *The LX39 Latent Fingerprint Matcher*, NBS special publication, U.S. Department of Commerce/National Bureau of Standards; no. 500–36, 1978.

In the field of digital and analog communications, wireless devices are becoming more commonplace. Inexpensive computer systems are currently commercially available wherein printers communicate with computers which in turn communicate with other computers via infrared transmitters and receivers. Other devices, using other optical communication systems, such as data transmitting/receiving wrist watches are now available in department stores at substantially affordable prices; these wrist watches include processors and software for communication with a computer and for downloading and uploading small amounts of data as required.

Biometric security identification systems, such as fingerprint scanning and input devices are becoming more commonplace as the need to validate authorized users of computers, databases, and secure spaces grows. As computers become more miniaturized, so too are other communication and security devices decreasing in size. One of the more important reasons, however, to miniaturize electronic devices is to lessen the burden of porting them.

One biometric security identification system provides each user with a hand-held portable fingerprint recognition and transmission device, for example, as disclosed in U.S. Pat. No: 6,111,977 to Scott et al. Their device includes a fingerprint scanner that encodes a fingerprint and sends the encoded fingerprint, via an infrared or a radio frequency transmitter, to a receiver in the secure item, facility or area. It is nonetheless necessary to have a central computer that analyzes the encoded fingerprint to allow recognition and authorization of an individual.

Generally, present electronic security systems are very inflexible in their functionality providing either full access to an authorized user or denying access if user authorization fails. It would be advantageous to have a handheld biometric identification device allowing an authorized user to provide gated access for a third party to a secure entity or service. For example, a stockbroker wants to provide access to a computer network for his assistants only during his presence. Using just a handheld biometric identification device he provides a gating signal to the security system enabling the system to respond to a signal provided by his assistant. The assistant is then able to send a signal requiring access to the security system using his handheld biometric identification device.

It is, therefore, an object of the invention to use the progress in miniaturization of processors and biometric sensors for enabling an authorized user of a secure entity or service to provide gated access for a third party to the secure entity or service.

SUMMARY OF THE INVENTION

In accordance with the present invention there is provided a method for providing gated access for a third party to a secure entity or service comprising the steps of: storing biometric data in dependence upon a biometric characteristic of a first designated user of the secure entity or service other than the third party; capturing biometric information representative of a biometric characteristic and providing biometric data in dependence thereupon; comparing the captured biometric data with the stored biometric data to produce a comparison result; and, if the comparison result is indicative of a match: providing a wireless gating signal for enabling wireless signals provided by the third party to access the secure entity or service.

In accordance with the present invention there is further provided a method of providing gated access for a third party to a secure entity or service comprising the steps of: receiving the gating signal at the secure entity or service; in response to the wireless gating signal, setting a flag within the secure entity or service, the flag for use in gating received wireless signals for controlling access to the secure entity or service such that in a first state the secure entity or service is non responsive to the wireless signals and in a second other state the secure entity or service is responsive to the wireless signals provided by the third party.

In accordance with an aspect of the present invention there is provided a method for providing gated access for a third party to a secure entity or service comprising the steps of: storing biometric data in dependence upon a biometric characteristic of a first designated user of the secure entity or service other than the third party; storing biometric data in dependence upon a biometric characteristic of the third party; capturing biometric information representative of a biometric characteristic and providing biometric data in dependence thereupon; comparing the captured biometric data with the stored biometric data of the first designated user to produce a comparison result; and, if the comparison result is indicative of a match: providing a wireless gating signal for enabling wireless signals provided by the third party to access the secure entity or service; receiving the gating signal at the secure entity or service; and, in response to the wireless gating signal, setting a flag within the secure entity or service, the flag for use in gating received wireless signals for controlling access to the secure entity or service such that in a first state the secure entity or service is non responsive to the wireless signals and in a second other state the secure entity or service is responsive to the wireless signals provided by the third party.

In accordance with the aspect of the present invention there is further provided a method for providing gated access for a third party to a secure entity or service comprising the steps of: capturing biometric information representative of the biometric characteristic of the third party and providing biometric data in dependence thereupon; comparing the captured biometric data with the stored biometric data of the third party to produce a comparison result; and, if the comparison result is indicative of a match: providing a wireless signal to the secure entity or service.

In accordance with another aspect of the present invention there is further provided a method for providing gated access for a third party to a secure entity or service comprising the steps of: providing to a first designated user other than the third party a first portable biometric device operable to capture biometric information presented thereto, the portable biometric device having stored biometric data in dependence upon a biometric characteristic of the first designated user; providing the third party with a second other portable biometric device operable to capture biometric information presented thereto, the portable biometric device having stored biometric data in dependence upon a biometric characteristic of the third party; capturing biometric information representative of a biometric characteristic in response to the first designated user presenting said information to the first portable biometric device and providing biometric data in dependence thereupon; comparing the captured biometric data with the stored biometric data in the first portable biometric device to produce a comparison result; and, if the comparison result is indicative of a match, performing the steps of: providing a wireless gating signal from the first portable biometric device for enabling wireless signals provided by the third party to access the secure entity or service; receiving the gating signal at a port of the secure entity or service; and, in response to the wireless gating signal, setting a flag within a locking mechanism of the secure entity or service, the flag for use in gating received wireless signals for controlling access to the secure entity or service such that in a first state the locking mechanism is non responsive to the wireless signals and in a second other state the locking mechanism is responsive to the wireless signals provided by the third party.

In accordance with the other aspect of the present invention there is further provided a method for providing gated access for a third party to a secure entity or service comprising the steps of: capturing biometric information representative of a biometric characteristic in response to the third party presenting said information to the second portable biometric device and providing biometric data in dependence thereupon; comparing the captured biometric data with the stored biometric data in the second portable biometric device to produce a comparison result; if the comparison result is indicative of a match, performing the steps of: capturing biometric information representative of the biometric characteristic of the third party and providing biometric data in dependence thereupon; comparing the captured biometric data with the stored biometric data of the third party to produce a comparison result; and, if the comparison result is indicative of a match: transmitting a wireless signal from the second portable biometric device to a port of the secure entity or service.

In accordance with yet another aspect of the present invention there is provided a security system for securing an entity or a service from indiscriminate access and for providing gated access for a third party, the security system comprising: at least a portable biometric device, the device comprising: a biometric sensor for capturing biometric information representative of a biometric characteristic in response to a person presenting said information to the portable biometric device; an encoder for digitally encoding the captured biometric information and providing biometric data in dependence thereupon; memory for storing biometric data indicative of a biometric characteristic of a first designated user; a processor for comparing the captured biometric data with stored biometric data to produce a comparison result, and if the comparison result is indicative of the first designated user for providing a wireless gating signal for enabling wireless signals provided by the third party to access the secure entity or service, and if the comparison result is indicative of the third party for providing a wireless signal; and, a transmitter for wireless transmission of the wireless gating signal or the wireless signal; at least a port for receiving the wireless gating signal and the wireless signal from the portable biometric device; and, a locking mechanism for securing the entity or service, the locking mechanism comprising a processor for setting a flag in response to the wireless gating signal, the flag for use in gating received wireless signals for controlling access to the secure entity or service such that in a first state the locking mechanism is non responsive to the wireless signals and in a second other state the locking mechanism is responsive to the wireless signals provided by the third party.

BRIEF DESCRIPTION OF FIGURES

Exemplary embodiments of the invention will now be described in conjunction with the following drawings, in which:

FIG. 2b is a simplified flow diagram illustrating a continuation of the method of operation according to the invention shown in FIG. 2a;

FIG. 4a is a simplified flow diagram illustrating yet another embodiment of a method of operation according to the invention of the biometric security system shown in FIG. 1; and, FIG. 4b is a simplified flow diagram illustrating a continuation of the method of operation according to the invention shown in FIG. 4a.

DETAILED DESCRIPTION OF PREFERRED EMBODIMENTS

Figure 1:
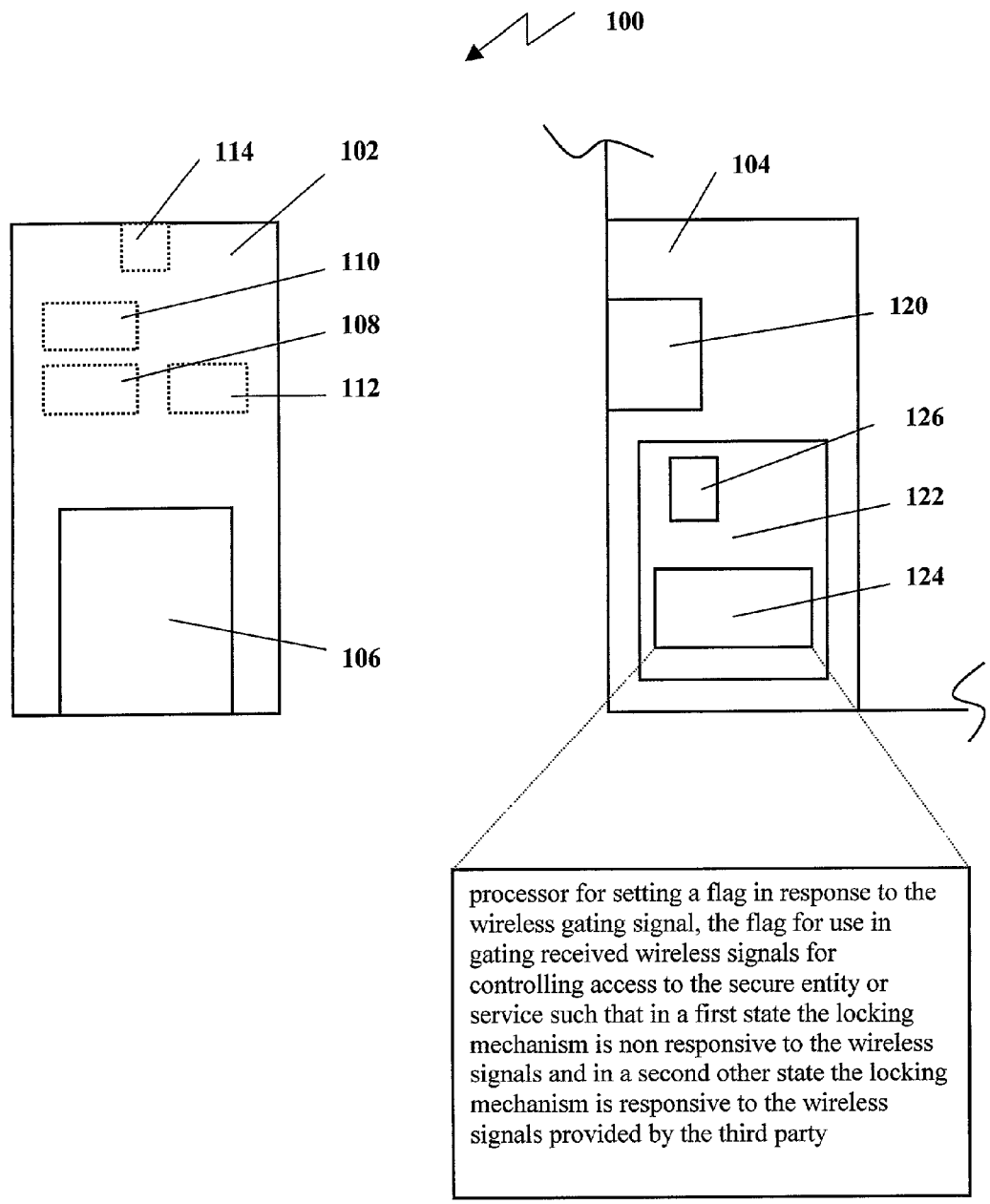
FIG. 1 is a simplified block diagram illustrating a biometric security system according to the invention.

FIG. 1 illustrates the block diagram of a biometric security system 100 for securing an entity or service from indiscriminate access according to the invention. The system 100 comprises at least a portable biometric device 102 and at least a receiving module 104 connected over a transmission channel. For simplicity, only one portable biometric device 102 and one receiving module 104 is shown in FIG. 1, but it is obvious that the invention is not limited thereto. Preferably, the system comprises a plurality of portable biometric devices 102, one for a first designated user and one for each person of a third party. Further preferably, the at least a portable biometric device 102 and the at least a receiving module 104 are connected over a wireless transmission channel such as infrared transmission or radio frequency transmission for user convenience. The portable biometric device 102 comprises a biometric sensor 106 for capturing biometric information representative of a biometric characteristic in response to a person presenting said information. In a preferred embodiment the biometric sensor 106 comprises a capacitive fingerprint imager for its compact design, but obviously the invention is not limited thereto. An encoder 108 digitizes or otherwise converts the analog signal into a signal format, which provides an encoded description of the biometric characteristic, suitable for processing. A processor 110 compares the captured biometric data with biometric data of the first designated user stored in memory 112 to produce a comparison result. Preferably, the memory 112 is a non-volatile memory. If the comparison result is indicative of a match a gating signal for enabling signals provided by the third party to access the secure entity or service is provided to a transmitter 114 for transmitting the signal to a port 120 of the receiving module 104. In response to the gating signal, a processor 124 of a locking mechanism 122 sets a flag for use in gating received signals from the third party for controlling access to the secure entity or service. The flag is set such that in a first state the locking mechanism 122 is non-responsive to the signals and in a second other state the locking mechanism 122 is responsive to the signals provided by the third party.

If the comparison result is other than a match a signal indicating a request from a third party is provided.

Alternatively biometric data in dependence upon a biometric characteristic of the third party is stored in memory of the portable biometric device 102. This allows restricting the access of a third party to designated persons of the third party.

Optionally, the locking mechanism comprises memory 126 for storing data indicative of access privileges. Further optionally, for each designated person of the third party a different signal is provided. This allows provision of various levels of access privileges to the secure entity or service for different persons of the third party.

Further optionally, the signals provided by different persons may be received at different ports 120. For example, a supervisor of a computer lab may provide one gating signal to one port for a plurality of computers. Each student is then enabled to access his respective computer providing a signal requiring access to the respective computer.

The portable biometric device 102 can be manufactured as a small handheld device such as a remote control, a watch, or a pendant comprising a transmitter 114 for wireless transmission such as infrared or radio frequency transmission. Alternatively, the portable biometric device 102 comprises a smart card, which is to be interfaced with the port 120 of the receiving module 104.

Figure 2A:
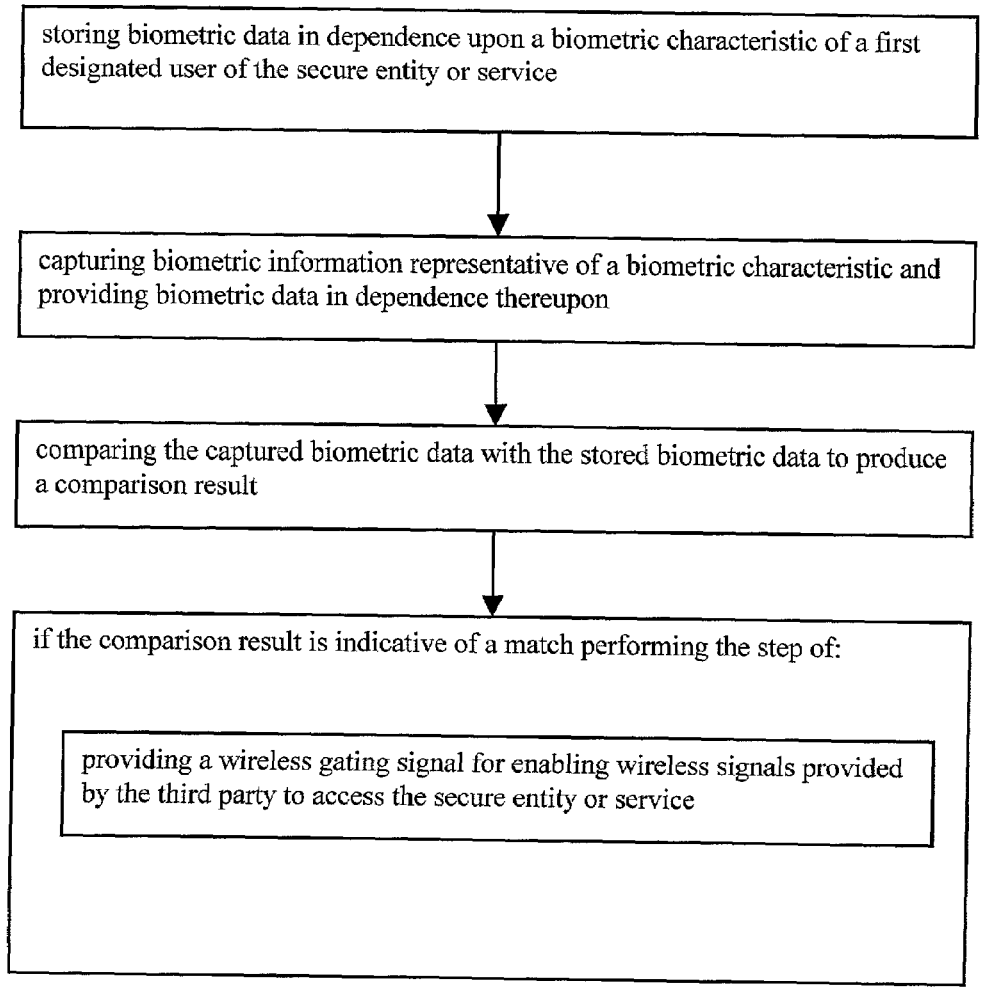
FIG. 2a is a simplified flow diagram illustrating a method of operation according to the invention of the biometric security system shown in FIG. 1.
Figure 2B:
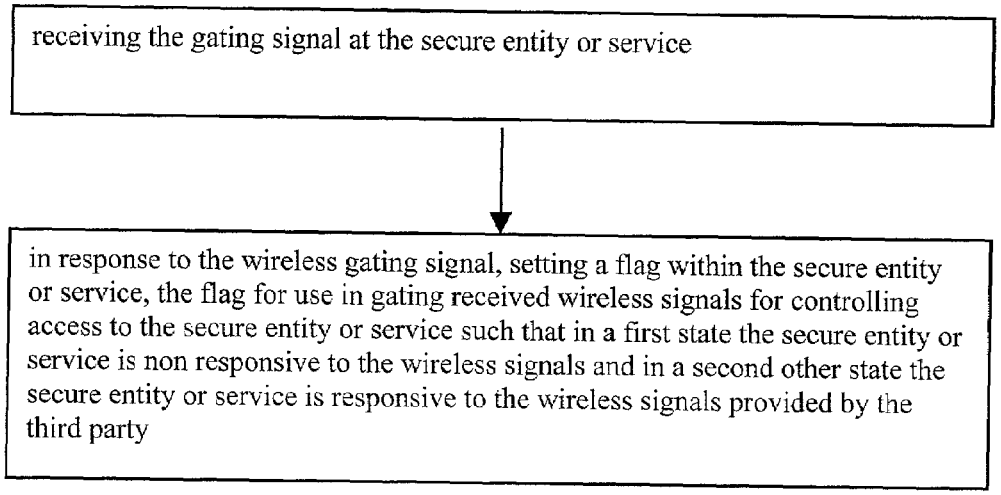

The flow diagrams in FIGS. 2a and 2b illustrate a method for providing gated access for a third party according to the invention using the portable biometric device 102 in conjunction with the receiving module 104. A first designated person is provided with a portable biometric device. Biometric data in dependence upon a biometric characteristic such as a fingerprint of the first person is stored in memory of the portable biometric device. The portable biometric device is preauthorized for use with a particular security system and personalized for use by a particular person. Prior to operation an administrator initializes the portable biometric device with the assistance of either a central computer or a personal computer. Alternatively, a first user of the portable biometric device providing biometric information to the sensor after fabrication is designated as authorized user and biometric data in dependence upon the captured biometric characteristic are stored in memory. Further alternatively, a plurality of persons may be authorized as first persons having same full access privileges.

A following function block starts the process in response, for example, to a touch of a person's digit to a fingerprint imager. The biometric information of the person is captured, encoded and biometric data in dependence thereupon is provided to the processor. Using the processor the captured biometric data is then compared with the stored biometric data to produce a comparison result. If the comparison result is indicative of a match the first person is enabled to initiate provision of a gating signal for enabling signals provided by the third party to access the secure entity or service.

The gating signal is received at a port of the secure entity or service. In response to the gating signal, a processor within a locking mechanism of the secure entity or service sets a flag for use in gating received signals provided by a third party for controlling access to the secure entity or service. The flag is set such that in a first state the locking mechanism is non-responsive to the signals and in a second other state the locking mechanism is responsive to the signals provided by the third party.

If the first designated user has set the flag into the second other state access is provided to the secure entity or service by the third party upon receipt of the signal form the third party.

The first designated user can return the flag by providing a gating signal. Optionally, the flag is returned to the first state after a predetermined amount of time, thus providing a time limitation of the access to the secure entity or service by the third party.

Further optionally, the locking mechanism comprises memory for storing data determining access privileges comprising functional limitations of the secure entity or service for the third party.

The invention provides security and flexibility for users in many applications. For example, using the portable biometric device in the form of a TV remote control allows parents to limit TV access of their children in their absence to selected channels and/or times. Biometric data in dependence upon a biometric characteristic of the parents as first designated users is stored in memory of the remote control. Upon provision of, for example, a fingertip to a biometric sensor of the remote control the parents are identified as first designated users having full access privileges. The remote control provides a signal identifying them as authorized users allowing them to access all channels of the TV at any time. Furthermore, they are able to set functional limitations such as pre-selected channels and a time limitation for accessing the TV by their children. When the children press their fingertip on the biometric sensor of the remote control the comparison result is not indicative of a match identifying them as a third party and an according signal is provided. While the parents are at home the flag is set in a first state and the TV is not responsive to the signal provided by the children. Before leaving the parents just provide a gating signal using the remote to set the flag into a second state. Now the children are able to access the TV according to the preset access limitations.

Figure 3:
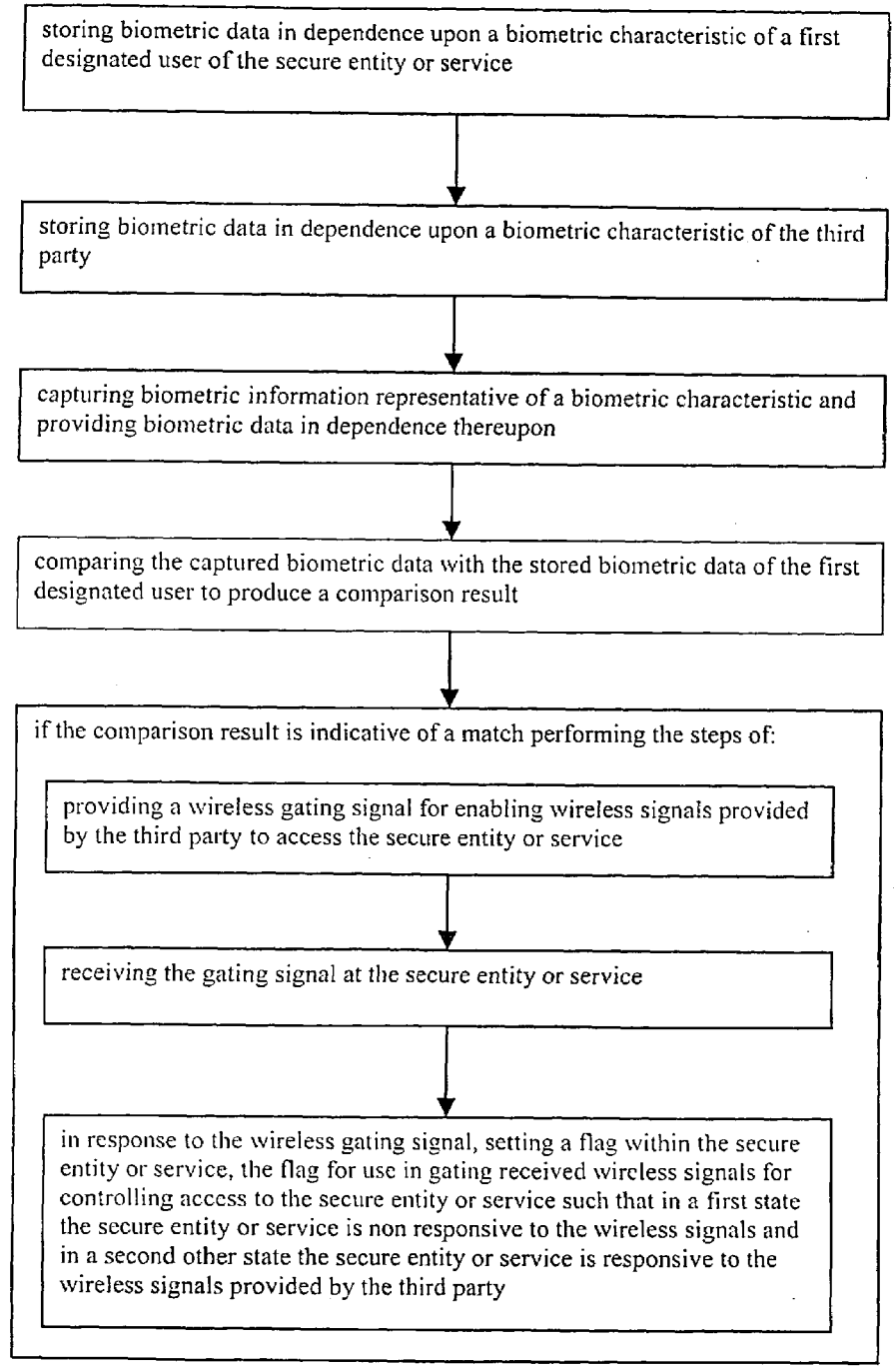
FIG. 3 is a simplified flow diagram illustrating another embodiment of a method of operation according to the invention of the biometric security system shown in FIG. 1.

In some applications it is not desirable to provide limited access to any other person but only to predetermined persons of a third party having limited access privileges. For such applications biometric data in dependence upon a biometric characteristic of one or more persons of a third party may be stored in memory of the portable biometric device as illustrated in the simplified flow diagram of FIG. 3. In dependence upon a recognized biometric characteristic a signal will be provided such as a signal indicating a first authorized user or a signal indicating a person of the third party.

Figure 4A:
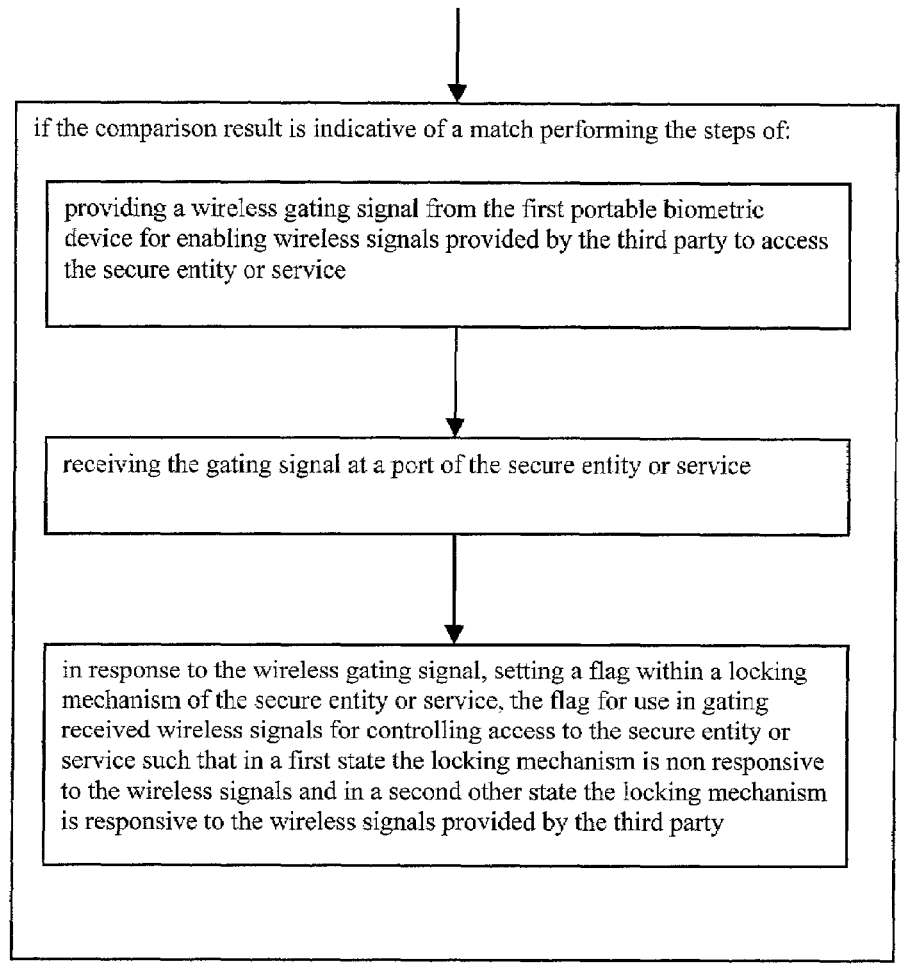
Figure 4B:
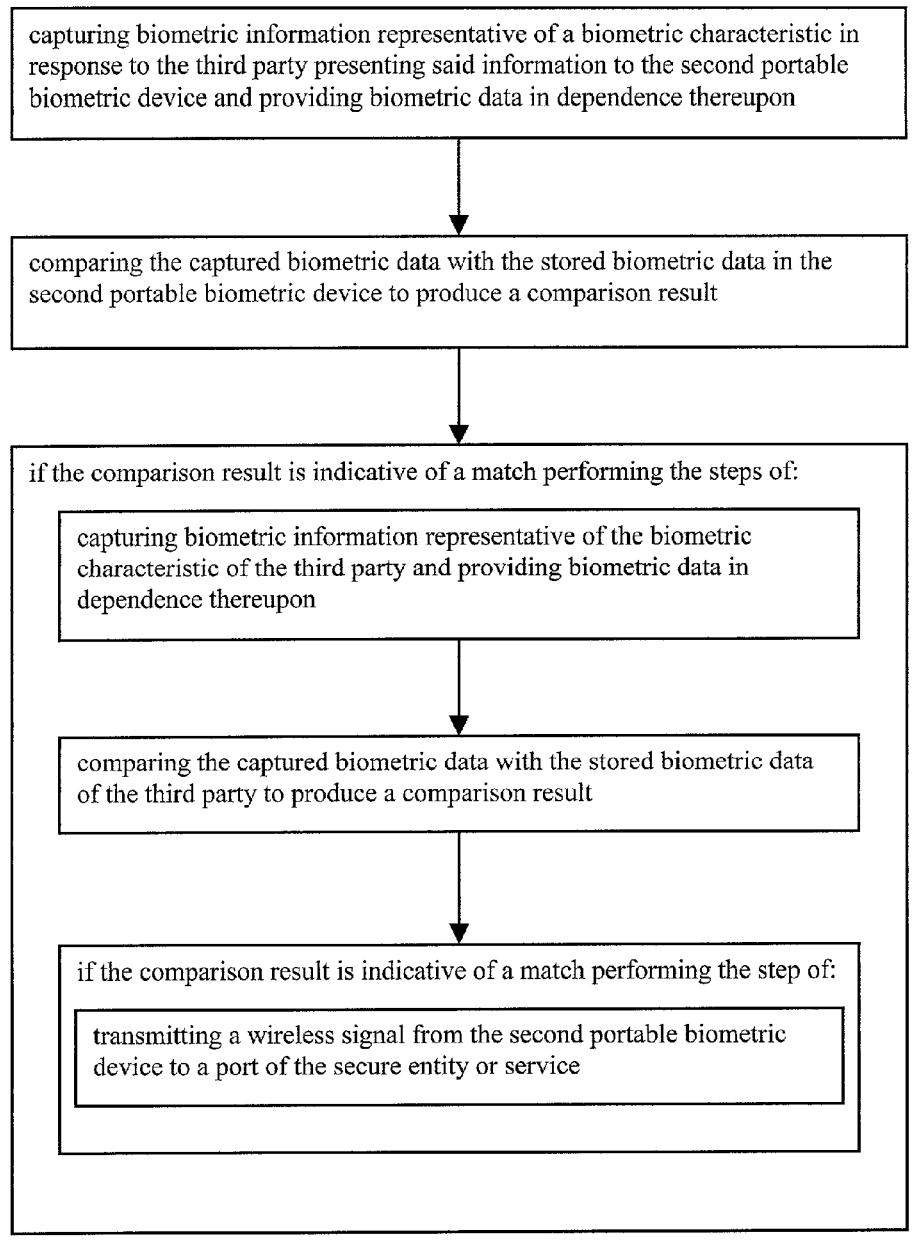

FIGS. 4a and 4b illustrate simplified flow diagrams of another preferred embodiment of a method for providing gated access for a third party according to the invention. Here, a first designated user is provided with a first portable biometric device having stored biometric data in dependence upon a biometric characteristic of the first designated user. A third party is provided with a second other portable biometric device having stored biometric data in dependence upon a biometric characteristic of the third party. The first designated user is able to provide a gating signal to the locking mechanism of a secure entity or service by providing, for example, a fingerprint to the first portable biometric device. The gating signal is received at a port of the secure entity or service and a processor set a flag for gating signals provided by the third party. A person of the third party provides a fingerprint to the second portable biometric device and if a comparison result is indicative of a match a signal is provided from the second portable biometric device to a port of the secure entity or service. If the flag is set in a second state access is provided for the third party. The third party may comprise a plurality of persons each having a portable biometric device, or groups of persons are sharing a portable biometric device wherein biometric data of a biometric characteristic of each person of the group of persons is stored in memory of the device.

Optionally, different persons of the plurality of persons have different predetermined access privileges and the portable biometric device provides a respective signal associated with the person.

The security system according to the invention and the method operating it provides secure access and flexibility to a secure entity or service in numerous applications. For example, a stockbroker wants to provide access to a computer network for his staff only during his presence. Using just a handheld biometric identification device he provides a gating signal to the security system enabling the system to respond to a signal provided by a member of his staff. Each staff member is then able to access the computer network using a workstation by providing a fingerprint to a respective portable biometric device, which can be something like a remote control or something as inconspicuous as a pendant. Furthermore, he can determine access privileges for different members of his staff. For example, clerical staff members may be prevented from performing financial transactions. Numerous other applications can be found in securing buildings, hazardous areas and materials, vehicles, etc.

Numerous other embodiments of the invention will be apparent to persons skilled in the art without departing from the spirit and scope of the invention as defined in the appended claims.

What is claimed is:

1. A method for providing gated access for a third party to a secure entity or service comprising:
   storing biometric data in dependence upon a biometric characteristic of a first designated user of the secure entity or service other than the third party;
   capturing biometric information representative of a biometric characteristic and providing biometric data in dependence thereupon;
   comparing the captured biometric data with the stored biometric data to produce a comparison result; and,
   if the comparison result is indicative of a match:
      providing a wireless gating signal for enabling wireless signals provided by the third party to access the secure entity or service said access provided for a predetermined, limited period of time.

2. A method of providing gated access for a third party to a secure entity or service as defined in claim 1, comprising:
   receiving the gating signal at the secure entity or service;
   in response to the wireless gating signal, setting a flag within the secure entity or service, the flag for use in gating received wireless signals for controlling access to the secure entity or service such that in a first state the secure entity or service is non responsive to the wireless signals and in a second other state the secure entity or service is responsive to the wireless signals provided by the third party.

3. A method for providing gated access for a third party to a secure entity or service as defined is claim 2, wherein the flag is returned to the first state after a predetermined amount of time.

4. A method for providing gated access for a third party to a secure entity or service comprising:
   storing biometric data in dependence upon a biometric characteristic of a first designated user of the secure entity or service other than the third party;
   storing biometric data in dependence upon a biometric characteristic of the third party;
   capturing biometric information representative of a biometric characteristic and providing biometric data in dependence thereupon;
   comparing the captured biometric data with the stored biometric data of the first designated user to produce a comparison result; and,
   if the comparison result is indicative of a match:
      providing a wireless gating signal for enabling wireless signals provided by the third party to access the secure entity or service;
      receiving the gating signal at the secure entity or service; and,
   in response to the wireless gating signal, setting a flag within the secure entity or service, the flag for use in gating received wireless signals for controlling access to the secure entity or service such that in a first state the secure entity or service is non responsive to the wireless signals and in a second other state the secure entity or service is responsive to the wireless signals provided by the third party, the flag supporting a timing function such that the flag once set to the second other state returns to the first state after a predetermined, limited period of time absent additional comparison results indicative of a match.

5. A method for providing gated access for a third party to a secure entity or service as defined in claim 4, comprising:
   capturing biometric information representative of the biometric characteristic of the third party and providing biometric data in dependence thereupon;
      comparing the captured biometric data with the stored biometric data of the third party to produce a comparison result; and,
   if the comparison result is indicative of a match:
      providing a wireless signal to the secure entity or service.

6. A method for providing gated access for a third party to a secure entity or service as defined in claim 5, comprising providing access to the secure entity or service by the third party if the flag is in the second other state.

7. A method for providing gated access for a third party to a secure entity or service as defined in claim 5, wherein the third party comprises a plurality of persons.

8. A method for providing gated access for a third party to a secure entity or service as defined in claim 7, wherein different persons of the plurality of persons have different predetermined access privileges.

9. A method for providing gated access for a third party to a secure entity or service as defined in claim 8, comprising a plurality of different wireless signals associated with different persons of the third party having different access privileges.

10. A method for providing gated access for a third party to a secure entity or service as defined in claim 8, wherein the different predetermined access privileges comprise functional limitations of the secure entity or service.

11. A method for providing gated access for a third party to a secure entity or service comprising:
   providing to a first designated user other than the third party a first portable biometric device operable to capture biometric information presented thereto, the portable biometric device having stored biometric data in dependence upon a biometric characteristic of the first designated user;

providing the third party with a second other portable biometric device operable to capture biometric information presented thereto, the second portable biometric device having stored biometric data in dependence upon a biometric characteristic of the third party;

capturing biometric information representative of a biometric characteristic in response to the first designated user presenting said information to the first portable biometric device and providing biometric data in dependence thereupon;

comparing the captured biometric data with the stored biometric data in the first portable biometric device to produce a comparison result; and, if the comparison result is indicative of a match, performing:

providing a wireless gating signal from the first portable biometric device for enabling wireless signals provided by the third party to access the secure entity or service;

receiving the gating signal at a port of the secure entity or service; and, in response to the wire less gating signal, setting a flag within a locking mechanism of the secure entity or service, the flag for use in gating received wireless signals for controlling access to the secure entity or service such that in a first state the locking mechanism is non responsive to the wireless signals and in a second other state the locking mechanism is responsive to the wireless signals provided by the third party.

12. A method for providing gaited access for a third party to a secure entity or service as defined in claim 11, comprising:

capturing biometric information representative of a biometric characteristic in response to the third party presenting said information to the second portable biometric device and providing biometric data in dependence thereupon;

comparing the captured biometric data with time stored biometric data in the second portable biometric device to produce a comparison result;

if the comparison result is indicative of a match, performing:

capturing biometric information representative of the biometric characteristic of the third party and providing biometric data in dependence thereupon;

comparing the captured biometric data with the stored biometric data of the third party to produce a comparison result; and, if the comparison result is indicative of a match:

transmitting a wireless signal from the second portable biometric device to a port of the secure entity or service.

13. A method for providing gated access for a third party to a secure entity or service as defined in claim 12, comprising providing access to the secure entity or service by the third party if the flag is in the second other state.

14. A method for providing gated access for a third party to a secure entity or service as defined in claim 12, wherein the wireless gating signal from the first portable biometric device and the wireless signal from the second portable biometric device are received at different ports of the secure entity or service.

15. A security system for securing an entity or a service from indiscriminate access and for providing gated access for a third party, the security system comprising:

at least a portable biometric device, the device comprising:

a biometric sensor for capturing biometric information representative of a biometric characteristic in response to a person presenting said information to the portable biometric device;

an encoder for digitally encoding the captured biometric information and providing biometric data in dependence thereupon;

memory for storing biometric data indicative of a biometric characteristic of a first designated user;

a processor for comparing the captured biometric data with stored biometric data to produce a comparison result, and if the comparison result is indicative of the first designated user for providing a wireless gating signal for enabling wireless signals provided by the third party to access the secure entity or service, and if the comparison result is indicative of the third party for providing a wireless signal;

a transmitter for wireless transmission of the wireless gating signal or the wireless signal;

at least a port for receiving the wireless gating signal and the wireless signal from the portable biometric device; and, a locking mechanism for securing the entity or service, the locking mechanism comprising a processor for setting a flag in response to the wireless gating signal, the flag for use in gating received wireless signals for controlling access to the secure entity or service such that in a first state the locking mechanism is non responsive to the wireless signals and in a second other state the looking mechanism is responsive to the wireless signals provided by the third party.

16. A security system for securing an entity or a service from indiscriminate access as defined in claim 15, wherein the portable biometric device comprises memory for storing biometric data indicative of a biometric characteristic of the third party.

17. A security system for securing an entity or a service from indiscriminate to access as defined in claim 16, wherein the security system comprises a first portable biometric device for use by the first designated user and a second other portable biometric device for use by the third party.

18. A security system for securing an entity or a service from indiscriminate access as defined in claim 15, wherein the biometric sensor comprises a fingerprint imager.

19. A security system for securing an entity or a service from indiscriminate access as defined in claim 18, wherein the fingerprint imager comprises a capacitive fingerprint imager.

20. A security system for securing an entity or a service from indiscriminate access as defined in claim 15, wherein the locking mechanism comprises memory for storing data indicative of access privileges.

* * * * *

UNITED STATES PATENT AND TRADEMARK OFFICE
CERTIFICATE OF CORRECTION

PATENT NO. : 7,200,755 B2
APPLICATION NO. : 09/863301
DATED : April 3, 2007
INVENTOR(S) : Larry Hamid et al.

It is certified that error appears in the above-identified patent and that said Letters Patent is hereby corrected as shown below:

Column 9,
Line 60, delete "is" and insert -- in --.

Column 12,
Line 35, delete "looking" and insert -- locking --.

Signed and Sealed this

Eighth Day of July, 2008

JON W. DUDAS
*Director of the United States Patent and Trademark Office*